(No Model.)
R. V. KENNEDY.
ATTACHMENT FOR PLOWS.
No. 253,395.          Patented Feb. 7, 1882.
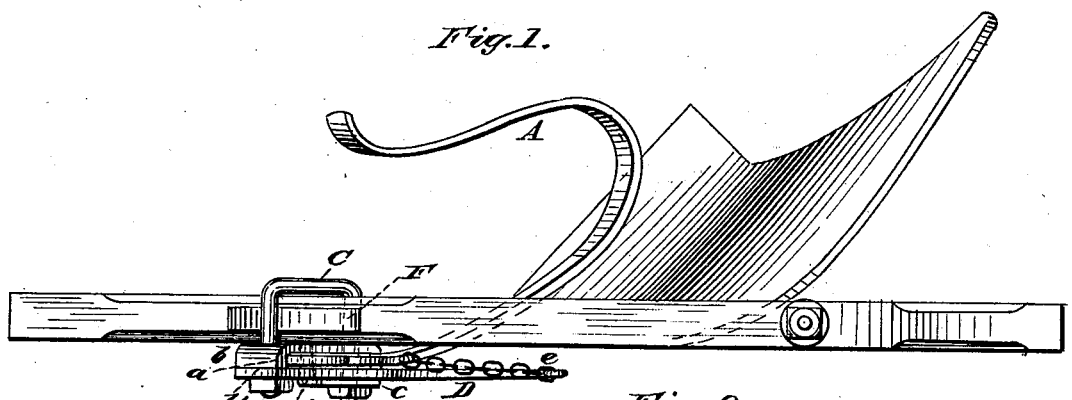
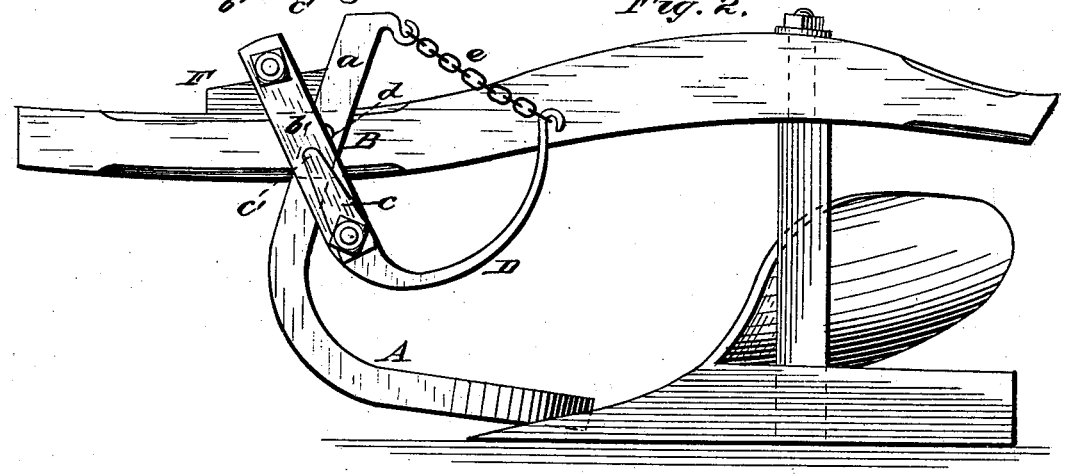
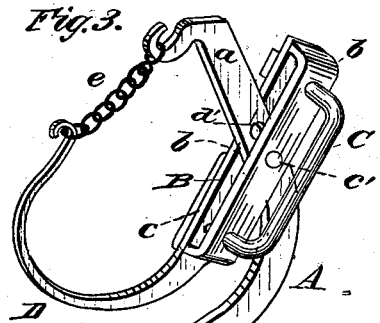
WITNESSES
Ruluf V Kennedy
INVENTOR,
by Louis Bagger & Co.
Attorneys,

UNITED STATES PATENT OFFICE.

RULIF V. KENNEDY, OF MODENA, MISSOURI.

ATTACHMENT FOR PLOWS.

SPECIFICATION forming part of Letters Patent No. 253,395, dated February 7, 1882.

Application filed August 6, 1881. (No model.)

*To all whom it may concern:*

Be it known that I, RULIF V. KENNEDY, of Modena, in the county of Mercer and State of Missouri, have invented certain new and useful Improvements in Attachments for Plows; and I do hereby declare that the following is a full, clear, and exact description of the invention, which will enable others skilled in the art to which it appertains to make and use the same, reference being had to the accompanying drawings, which form a part of this specification, and in which—

Figure 1 is a plan view of my improved weed and stalk breaker attachment for plows as applied for use. Fig. 2 is a side view thereof, and Fig. 3 is a detailed perspective view of my said attachment for plows.

This invention has relation to improvements in that class of attachments for plows for breaking stalks and removing weeds or stubble in the path of the plow, having for its object to effect the thorough and expeditious performance of these without liability of wrenching from its securing-point or endangering the breaking of the attachment; and it consists in the detailed construction and combination of parts of the attachment, as hereinafter more fully set forth, and particularly pointed out in the claims.

In carrying out my invention I employ, as will be seen by reference to the accompanying drawings, a hook, A, its body having an approximate U-shaped form, and one end turned outwardly in order to direct the intercepted weeds, stalks, or stubble toward the center of the hook. The other end of the hook has a vertical shank, *a*. The hook is attached to the beam of the plow (any plow) so as to stand a little above and back of the plow-point, to enable it to intercept and break stalks, stubble, and weeds in the path of the plow.

B is a clip or eye composed of one plate, *b*, having right-angularly bent or formed ends, against which is removably secured a second plate, *d'*, by a staple-shaped bolt, C, embracing the beam and by which the clip itself is removably secured to the beam. The clip is arranged obliquely upon the side of the beam to receive the shank of the hook which is hung therein, also detachably by a plate, *c*, itself being secured by one arm of the staple shaped bolt C and having a pin, *c'*, which passes through a perforation in one of the plates of the clip B, and any desired one of a number of adjusting holes or perforations, *d*, in the hook-shank *a*. It will also be noticed from this that the hook is capable of vertical adjustment to adapt it to the height of the stalks, stubble, &c., to be removed or acted on.

Preferably formed with one of the plates of the eye or clip B is an upwardly-curved spring, D, its upper hooked end being connected by chain *e* or otherwise to the upper hooked end of the hook-shank *a*. By this arrangement the hook is capable of yielding so as to free itself when pressed by the stubble, stalks, or weeds, or an accumulated mass of these beyond its power of resistance, thus avoiding the wrenching from its securing-point or the breaking of the hook. By means of a wedge, F, inserted under the staples C, the latter may be adjusted, as well as by the chain and spring, to vary its height with relation to the plow or stubble. This stalk, stubble, or weed breaker or clearer does its work effectually and expeditiously, and, as is readily understood from the foregoing, is adapted for use in connection with any plow.

Having thus fully described my invention, I claim and desire to secure by Letters Patent—

1. The hook A, having the vertical shank *a*, in combination with the clip B, bolted to the plow-beam, and having the plate *c*, provided with a pin, *c'*, upon which the hook is hung or pivoted, substantially as and for the purpose set forth.

2. The combination, with the hook A, having the vertical shank *a*, of the clip B and spring D, connected to the hook-shank and the clip, substantially as and for the purpose set forth.

In testimony that I claim the foregoing as my own I have hereunto affixed my signature in presence of two witnesses.

RULIF V. KENNEDY.

Witnesses:
JOSHUA ETHERTON,
ELISAH MORISON.